United States Patent Office 3,531,085
Patented Sept. 29, 1970

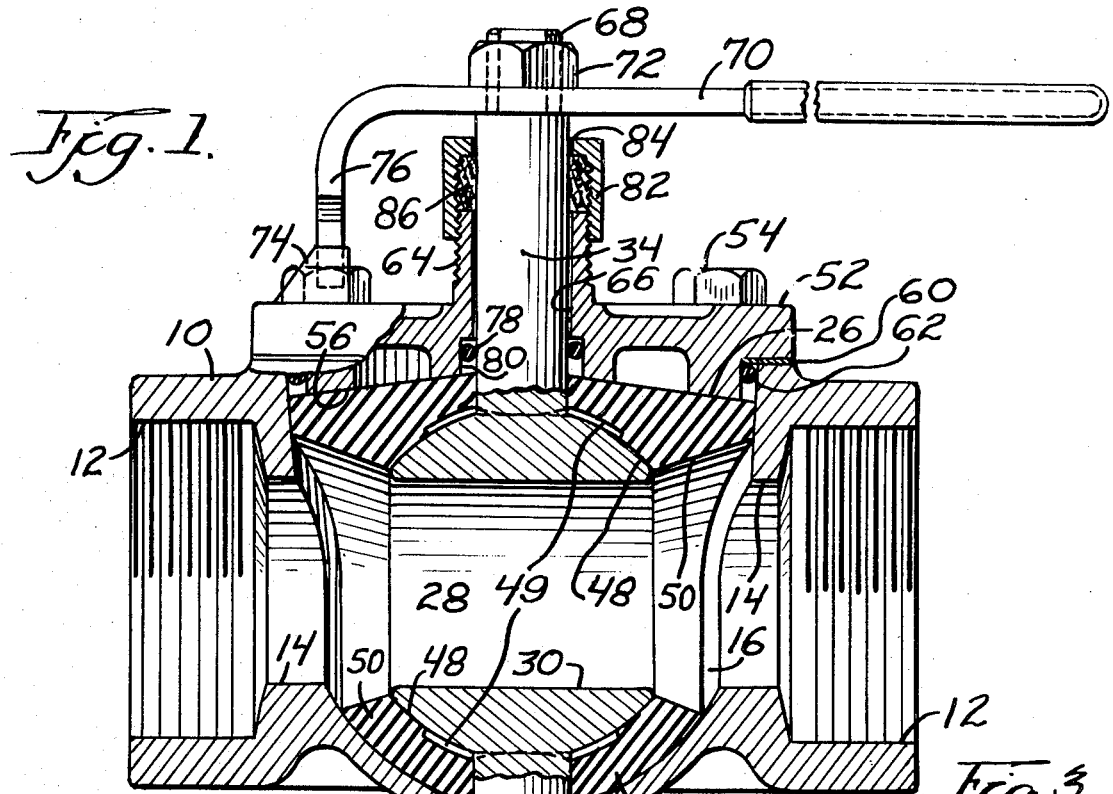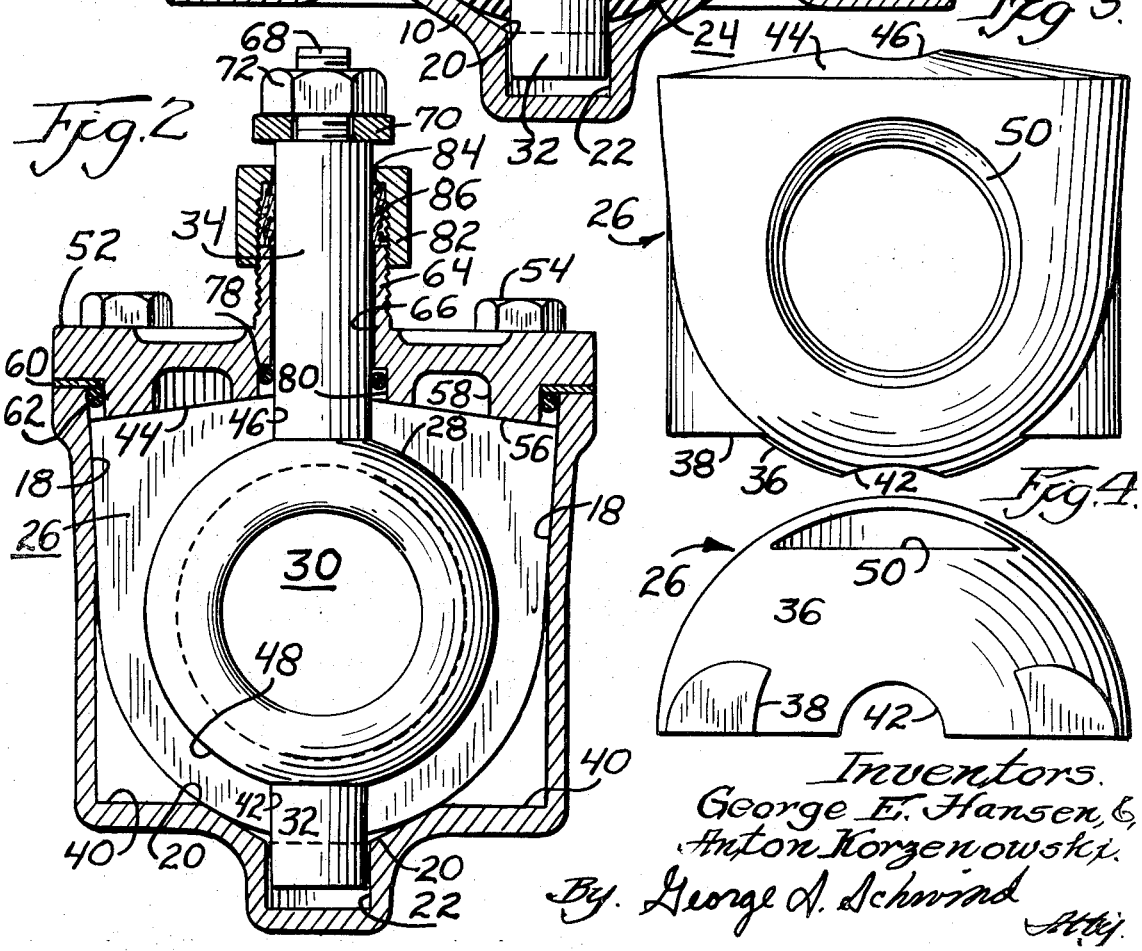

3,531,085
GEM BALL VALVE
George E. Hansen, Elmwood Park, and Anton Korzenowski, Brookfield, Ill., assignors to Crane Co., Chicago, Ill., a corporation of Illinois
Filed Dec. 12, 1967, Ser. No. 689,998
Int. Cl. F16k 5/06
U.S. Cl. 251—315                                     6 Claims

ABSTRACT OF THE DISCLOSURE

A ball valve of the type employing a two-piece flexible valve seat for encapsulation of a ported spheroidal valve closure member. The valve comprises a casing having a frusto-conical valve chamber which is open at its upper end and which has an essentially spheroidal lower surface portion. The lower portion of the two-piece valve seat is essentially congruent with the lower portion of the valve chamber, and includes means for resisting relative rotation therebetween. The ball closure member includes a trunnion portion which projects through the lower surface of the valve seat and into an aperture formed in the lower surface portion of the valve chamber. The closure member is also provided with a stem portion which projects through the upper surface of the valve seat. The upper surface of the valve seat has an essentially frusto-conical configuration, being slightly angled upwardly toward the stem. A cover closes the open end of the valve chamber and snugly overlies the upper surface of the valve seat. The lower surface of the cover may be provided with an annular recess for accommodating expansion of the valve seat. The stem projects through the cover to the exterior of the valve casing and may be sealed with an interior annular sealing ring and/or an exterior packing nut arrangement.

BACKGROUND—SUMMARY—PRIOR ART

This invention relates to an improved ball valve construction and, more particularly, to an improved divided valve seat and cover arrangement for use in connection with a spheroidal valve closure member.

The invention is particularly directed toward improvements in the ball valve construction previously described and claimed in United States Pats. No. 3,100,501, No. 3,168,900 and No. 3,171,431, all assigned to the assignee of the present application. These patents relate to ball valves of the type employing a flexible valve seat which serves to encapsulate a ported ball closure member.

The valve seat is typically formed of an elastomeric material, such as Buna-N. In this type of ball valve, it is particularly important to achieve a structural design which will completely eliminate fluid leakage without subjecting the flexible valve seat to undue stress or deformation. This problem has been especially significant in larger sizes of ball valves, where machining and molding tolerances are more difficult to maintain. Moreover, the volume of material in the flexible valve seat should be minimized to prevent undue expansion and resultant extrusion of the material into ports and aperture. In addition, it is desirable to maintain as uniform a loading as possible upon the valve seat in order to insure adequate fluid sealing.

It has now been discovered that certain structural changes in existing ball valve constructions of this type will result in significantly enhanced performance, particularly in larger sizes of ball valves. In accordance with this discovery, the present invention contemplates a ball valve comprised of a main casing having the usual inlet and outlet means. The casing defines an interior valve chamber which is essentially frusto-conical in configuration and which has an open upper portion and a substantially spheroidal lower surface portion. The ported flexible valve seat, which is fabricated in two identical halves, has a lower surface portion which is essentially congruent with the lower surface portion of the valve chamber. A ported spheroidal valve closure member is encapsulated within the mated halves of the valve seat, with the actuating stem of the closure member projecting through the upper surface portion of the valve seat. The upper surface portion of the seat is frusto-conical in configuration with a slight upward angle toward the stem. A cover or bonnet is provided to close the open end of the valve chamber and to snugly overlie the upper surface portion of the valve seat. Due to the slight upward frusto-conical angle of the upper surface portion of the valve seat, the total volume of material in the valve seat is reduced. Moreover, the loading on the valve seat is equalized, since the cross sectional area of the valve seat is made more uniform. The cover may also be provided with an interior annular recess to accommodate expansion of the valve seat. The stem, which projects through the cover to the exterior of the valve, may be sealed by means of an annular sealing ring associated with the lower surface of the cover and/or a packing nut arrangement on the exterior of the cover.

BRIEF DESCRIPTION OF DRAWINGS

These and additional advantages and features of the invention will be more fully understood by a consideration of the remainder of the specification and the claims, with illustrative reference to the drawings, in which:

FIG. 1 is a sectional assembly view of a ball valve construction embodying the invention;

FIG. 2 is a transverse sectional view of the construction illustrated in FIG. 1;

FIG. 3 is a side elevational view of one of the two identical halves of a flexible valve seat member for use in accordance with the invention; and FIG. 4 is a bottom plan view of the valve seat half shown in FIG. 3.

DESCRIPTION OF EXEMPLARY EMBODIMENT

With reference to the drawings, there is illustrated a ball valve construction in accordance with the invention, comprising a conventional valve casing or body 10 having the usual threaded end connections 12 for attachment to a pipe line. The casing 10 defines a pair of ports 14 which provide fluid communication between the end connections 12 and an interior valve chamber 16. As best shown in FIG. 2, the valve chamber 16 is defined by a frusto-conical interior wall 18 of the casing 10. The valve chamber 16 is open at its upper end and closed at its lower end by a generally spheroidal surface portion 20 which constitutes an extension of the wall 18. Defined in the lower surface portion 20 of the valve chamber 16 is a trunnion bore 22. (As used herein, the terms "upper" and "lower" are related, for convenience only, to the spatial attitude of the valve as illustrated in the drawing, and are not to be taken as limitations.)

Located within the valve chamber 16 is a two-piece flexible valve seat generally denoted by the numeral 24. The valve seat 24 is composed of two identical mating halves 26, which serve to encapsulate a generally spheroidal valve closure member 28. The valve closure member 28, which is ported as at 30, includes a trunnion portion 32 and a stem portion 34. The advantages and structural features of the two-piece seat member 24, and its structural and functional relationship to the valve chamber 16 and the closure member 28, although described below, are likewise fully set forth in Pat. No. 3,171,431, referred to above.

As can be best seen in FIGS. 3 and 4, the valve seat halves 26 have a lower surface portion 36 which is essentially congruent with the wall 18 and the lower surface 20 of the valve chamber 16. Associated with the lower surface portion 36 of the valve half 26 are lugs or projecting portions 38 which co-operate with corresponding recessed portions 40 in the case 10 to prevent relative rotational movement of the valve seat 24 and the lower surface portion 20 of the valve chamber 16.

Defined in the lower surface portion 36 of the valve seat half 26 is an aperture 42 which permits projection of the trunnion portion 32 of the closure member 28 through the valve seat 24 and into the trunnion bore 22. The valve seat half 26 also includes an upper surface portion 44 which is generally frusto-conical in configuration and which is angled slightly upwardly toward a stem aperture 46 defined therein. The stem aperture 46 allows projection of the stem 34 through the valve seat 24 to the exterior of the valve.

The valve seat 24, when the mating halves 26 are assembled, forms a generally spheroidal interior hollow 48 for accommodation of the valve closure member 28. The valve seat halves 26 are provided with frusto-conical ports 50 which, when the valve is in the open position, allow fluid communication between the ports 14 through the port 30 in the closure member 28.

The open upper end of the valve chamber 16 is closed by a bonnet or cover 52 which is attached to the casing 10 by suitable fastening means, such as the bolts 54. The lower surface 56 of the cover 52 is frusto-conical in configuration and is essentially congruent with the upper surface portion 44 of the valve seat 24. An annular recess 58 is provided in the lower surface 56 of the cover 52 to accommodate expansion of the valve seat 24. A fluidtight seal between the cover 52 and the casing 10 is insured by an annular resilient gasket 60 and an O-ring 62.

The exterior surface of the cover 52 is provided with a tubular extension 64 associated with an aperture 66 in the cover. The stem 34 extends through the aperture 66 and the tubular extension 64 and terminates in a threaded end portion 68 which passes through a suitable aperture in an operating lever or handle 70. The lever 70 is fastened to the stem 34 by means of a nut or other suitable fastener 72. The exterior surface of the cover 52 is also provided with a pair of lugs or stop members 74 (only one shown) which cooperates with an offset portion 76 of the lever 70 to provide positive limitation of the lever operation and thus indicate the open and closed positions of the valve.

The stem 34 is interiorly sealed by means of an O-ring 78 associated with an annular depression 80 defined in the lower surface 56 of the cover 52 adjacent the aperture 66. The stem is also sealed on the exterior of the valve by means of a packing box or nut 82 threadably attached to the upper end of the tubular extension 64. The packing nut 82 is suitably apertured as at 84 to permit passage of the stem 34, and the interior thereof is filled with suitable packing material 86.

The operation of the illustrated ball valve is apparent from the foregoing description. The closure member 28 is free to rotate within the hollow 48 of the valve seat 24, and thus, by operation of the lever 70, the port 30 in the closure member may be moved into and out of alignment with the ports 50 in the valve seat. Recess portions 49, positioned in the inner periphery of seat 24, reduce the frictional forces for rotating member 28 and also allow for expansion of the elastomer. The trunnion seat 22 serves to maintain axial alignment of the closure member 28, and the lugs 38 and recesses 40 to serve to prevent the valve seat 24 from rotating.

The slight upward frusto-conical angle (which is preferably in the range of about 5° to about 15°, with reference to the valve horizontal axis of the casing 10) of the upper surface 44 of the valve seat 24 serves to make the cross section of the valve seat more nearly uniform and thus insures even loading by the correspondingly tapered lower surface 56 of the cover 52 when the cover is bolted into position. Moreover, the tapering of the upper surface 44 results in the use of less elastomeric material for the valve seat 24 and thus less chance of undesirable extrusion due to valve seat expansion. The annular recess 58 in the lower surface 56 of the cover 52 provides space for accommodating expansion of the valve seat 24.

Thus, when the cover 52 is tightened down, the halves 26 of the valve seat 24 mate positively about the encapsulated closure member 28, with minimal deformation or "squeezing" of the valve seat. In this way, the valve seat 24 establishes a fluidtight seal within the valve chamber 16, about the stem 34 and trunnion 32, without leakage of fluid therebetween. Moreover, the annular recess 58 in the lower surface 56 of the cover 52 permits expansion of the valve seat 24 without impairment of the efficacy of the seal. Finally, the dual seals provided by the O-ring 78 and the packing nut 82 prevent escape of fluid from around the stem 34.

We claim:

1. A ball valve comprising:
a casing having inlet and outlet means;
an essentially frusto-conical valve chamber defined by said casing between said inlet and outlet means and communicating therewith, said chamber having an open upper portion and an opposed lower surface portion of essentially spheroidal configuration with a trunnion seat defined therein;
a ported spheroidal closure member having a stem portion and a trunnion portion for mating with said trunnion seat;
a mated two-piece hollow ported flexible seat member for encapsulating said closure member, said seat member when mated having a lower surface portion essentially congruent with the lower surface portion of said valve chamber and having means to prevent relative rotational movement between said lower surface portions, the lower surface portion of said seat member defining an aperture permitting projection of the trunnion portion of said closure member therefrom;
said seat member when mated further having the entire upper surface portion of essentially frusto-conical configuration, said upper surface portion defining a stem aperture permitting projection of the stem portion of said closure member therefrom, said upper surface portion being slightly angled upwardly toward said stem aperture to thereby provide for uniform loading of said seat member; and
a cover for closing the open upper portion of said valve chamber, said cover being adapted to overlie and be essentially congruent with the upper surface portion of said seat member.

2. A ball valve in accordance with claim 1, wherein the upward frusto-conical angle of the upper surface portion of said seat member is in the range of from about 5° to about 15°, with reference to the valve horizontal axis of said casing.

3. A ball valve in accordance with claim 2, wherein the lower surface of said cover has defined therein at least one annular recess encircling said cover for accommodating expansion of said seat member.

4. A ball valve in accordance with claim 1, wherein said cover includes an aperture, a tubular member associated with said aperture on the upper surface of said cover, and sealing means associated with the upper end of said tubular member, said aperture, said tubular member and said sealing means being cooperatively adapted to permit projection of said stem portion of said closure member from said cover without loss of fluid from said valve.

5. A ball valve in accordance with claim 4, wherein said sealing means comprises an apertured packing nut threadably attached to the upper end of said tubular member.

6. A ball valve in accordance with claim 5, including in addition annular elastomeric stem sealing means associated with the lower surface of said cover.

References Cited

UNITED STATES PATENTS

| 1,113,129 | 10/1914 | Marr | 251—184 X |
| 3,171,431 | 3/1965 | Hansen et al. | 251—317 X |
| 3,192,948 | 7/1965 | Anderson et al. | 251—315 X |
| 3,223,111 | 12/1965 | Anderson | 251—171 X |

FOREIGN PATENTS

| 1,352,784 | 1/1964 | France. |

M. CARY NELSON, Primary Examiner

M. O. STRUM, Assistant Examiner